(12) United States Patent
Kaul (10) Patent No.: US 8,532,706 B2
(45) Date of Patent: Sep. 10, 2013

(54) TECHNIQUES TO MANAGE A SUBSCRIBER IDENTITY MODULE FOR A MOBILE WIRELESS DEVICE

(75) Inventor: Anupam Kaul, Sunnyvale, CA (US)

(73) Assignee: Palm, Inc., Sunnyvale, CA (US)

( * ) Notice: Subject to any disclaimer, the term of this patent is extended or adjusted under 35 U.S.C. 154(b) by 356 days.

(21) Appl. No.: 12/916,511

(22) Filed: Oct. 30, 2010

(65) Prior Publication Data

US 2012/0108294 A1     May 3, 2012

(51) Int. Cl.
    *H04B 1/38*     (2006.01)
(52) U.S. Cl.
    USPC ........... 455/558; 455/571; 455/572; 455/573; 455/574
(58) Field of Classification Search
    USPC ....................................... 455/558
    See application file for complete search history.

(56) References Cited

U.S. PATENT DOCUMENTS

| 6,799,155 | B1 * | 9/2004 | Lindemann et al. | ............ 703/24 |
| 2009/0156254 | A1 * | 6/2009 | Montes | ......................... 455/558 |
| 2011/0086670 | A1 * | 4/2011 | Shin | ............................. 455/558 |

* cited by examiner

*Primary Examiner* — Charles Appiah
*Assistant Examiner* — Natasha Cosme (57) ABSTRACT

Techniques to manage a subscriber identity module for a mobile wireless device are described. An apparatus may comprise a mobile computing device having a subscriber identity module (SIM) manager that when executed by a processor is operative to manage a physical SIM stored on a removable storage unit for the mobile computing device and a virtual SIM stored on a non-removable storage unit for the mobile computing device, the virtual SIM comprising contents copied from the physical SIM to allow the virtual SIM to perform operations on behalf of the physical SIM. Other embodiments are described and claimed.

16 Claims, 7 Drawing Sheets

DETECT A PHYSICAL SIM DURING A POWER-ON MODE OF A
MOBILE COMPUTING DEVICE
302

DETERMINE WHETHER THE PHYSICAL SIM HAS A
CORRESPONDING VIRTUAL SIM ON THE MOBILE COMPUTING
DEVICE
304

CREATE A CORRESPONDING VIRTUAL SIM ON THE MOBILE
COMPUTING DEVICE WHEN THE PHYSICAL SIM DOES NOT
HAVE A CORRESPONDING VIRTUAL SIM
306

SEND A CONTROL DIRECTIVE TO A POWER MANAGER TO PLACE
THE PHYSICAL SIM IN A POWER SAVINGS MODE OR
A POWER-OFF MODE
308

TECHNIQUES TO MANAGE A SUBSCRIBER IDENTITY MODULE FOR A MOBILE WIRELESS DEVICE

BACKGROUND

Mobile computing devices, such as smart phones, have become highly capable communication devices in recent years. In addition to the wide array of processing capabilities such as digital assistant (PDA) features, including word processing, spreadsheets, synchronization of information (e.g., email) with a desktop computer, and so forth, mobile computing devices also typically include wireless communications capabilities to provide features, such as mobile telephony, mobile email access, web browsing, and content (e.g., video and radio) reception. Exemplary wireless communications technologies include cellular, satellite, and mobile data networking technologies.

To implement certain wireless communications technologies, a mobile computing device may utilize a subscriber identity module (SIM). A SIM may store various types of information, including subscriber profile information, cryptographic and authentication information, network information, subscriber generated information, and so forth. A SIM is typically implemented as some form of removable storage, such as a SIM card that may be inserted into a SIM slot and fastened to an external or internal SIM interface for a mobile computing device. As removable storage, a SIM card may consume significant amounts of power, thereby shortening battery life for a mobile computing device. One solution to extend battery life is to place some portions of a mobile computing device, including a SIM card, into various power saving modes. However, a SIM card is frequently needed for various device or network operations, and is correspondingly brought out of power saving mode, which reduces the effectiveness of such power saving measures. Further, a SIM card may still unnecessarily draw current from a battery even when in a low power saving mode due to current leakage. It is with respect to these and other reasons that techniques to improve management of a SIM for a mobile computing device are needed.

DETAILED DESCRIPTION

Various embodiments are generally directed to techniques to manage a SIM for a mobile computing device. Some embodiments are particularly directed to creating a virtual SIM or a logical SIM for a mobile computing device that replicates a physical SIM. Various operations traditionally performed using a physical SIM may be performed using a virtual SIM, thereby allowing the physical SIM to remain in a complete power-off mode or a power saving mode for extended periods of time. As such, the virtual SIM may enhance power management for a mobile computing device, and extend battery life beyond conventional power management techniques, particularly when operating in a power-off mode by virtue of the physical SIM card drawing zero power or near zero power from the mobile computing device when the physical SIM is completely shut down.

In one embodiment, for example, a mobile computing device may comprise or implement a SIM manager that when executed by a processor is operative to manage a physical SIM stored on a removable storage unit for the mobile computing device and a virtual SIM stored on a non-removable storage unit for the mobile computing device. The virtual SIM may comprise or store contents copied from the physical SIM to allow the virtual SIM to perform operations on behalf of the physical SIM. Other embodiments are described and claimed.

The virtual SIM may emulate the physical SIM file data as well as the SIM logic that operates on this file data, limited to cases where all such file data can be transferred and understood by the mobile computing device. For all other cases, the SIM manager may transfer control to the physical SIM and then achieve the power-off state again once the virtual SIM is updated. For example, a response authentication packet data unit (APDU) of a request APDU that returns 9000 by itself could indicate updating the corresponding logic or file on the virtual SIM. The actual updated data on the physical SIM may not even be read again from the physical SIM, not even for synchronization, based on the success response of the previous update request, thus saving further transactions with the physical SIM. The SIM manager attempts to aggressively maintain a power savings or power-off state of the physical SIM for as long as possible.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements, nodes or modules in a certain topology by way of example, the embodiment may include other combinations of elements, nodes or modules in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment. It should also be understood that the use of the term control to refer to data and/or signals throughout the application can refer to data flowing in any direction as control and/or status data or signals.

Figure 1:
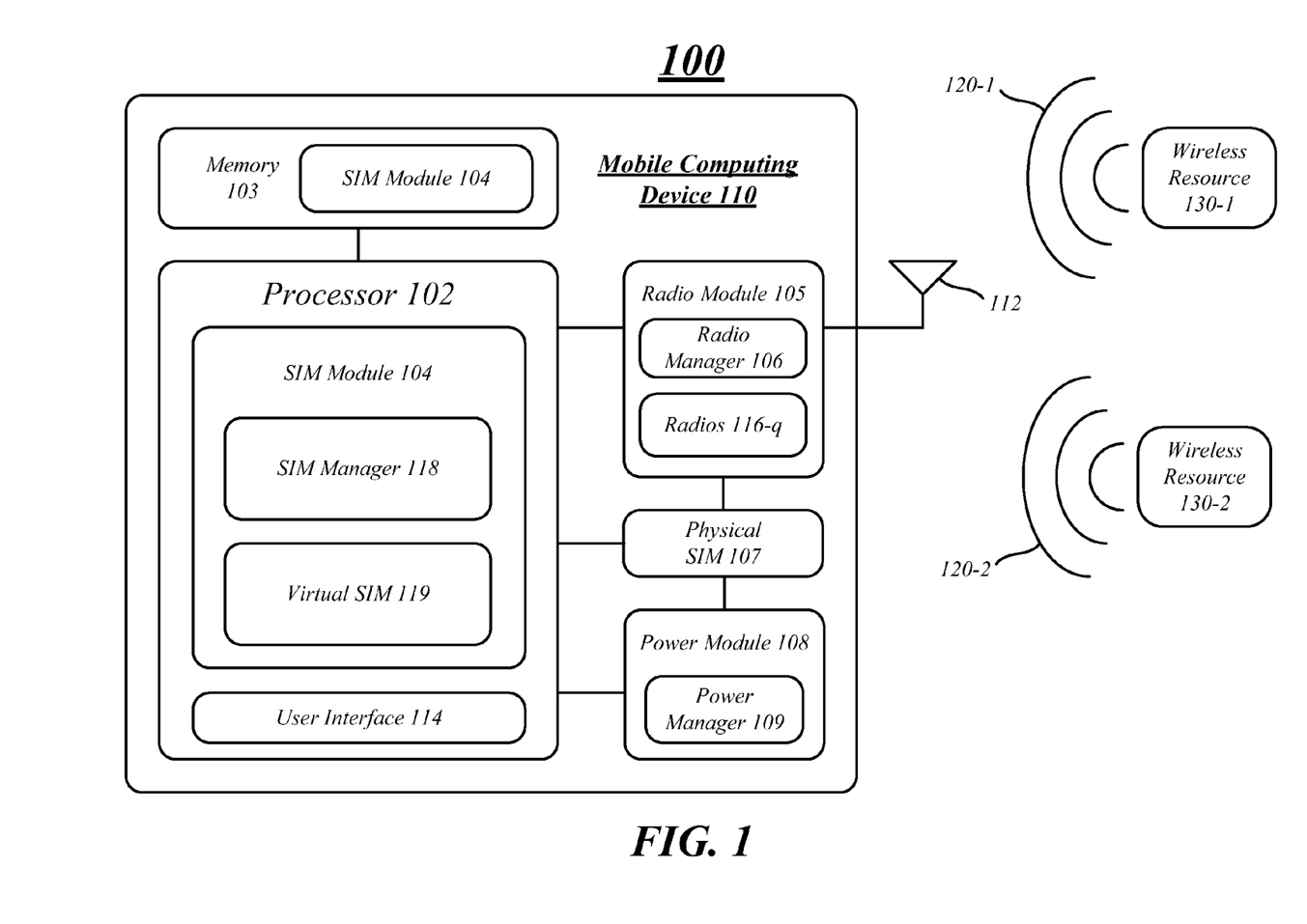
FIG. 1 illustrates one embodiment of a first mobile computing device.

FIG. 1 illustrates a communications system 100 comprising various representative elements, including a mobile computing device 110 capable of communicating via radio signals 120-$m$ with one or more wireless resources 130-$n$. It is worthy to note that "m" and "n" and similar designators as used herein are intended to be variables representing any positive integer. Thus, for example, if a given implementation sets a value for n=2, then a complete set of wireless resources 130-$n$ may include wireless resources 130-1, 130-2. The embodiments are not limited in this context.

In the illustrated embodiment shown in FIG. 1, the mobile computing device 110 may include by way of example and not limitation a host or a radio processor 102, a memory 103, a SIM module 104, a radio module 105, a physical SIM 107, a power module 108, an antenna 112, and a user interface 114. The SIM module 104 may further include a SIM manager 118 and a virtual SIM 119. The radio module 105 may further include a radio manager 106 and one or more radios 116-$q$.

The power module 108 may further include a power manager 109. These elements or portions of these elements may be implemented in hardware, software, firmware, or in any combination thereof. The embodiments are not limited to these depicted elements.

In some embodiments, one or more interfaces may employ various techniques to exchange information between the elements of the mobile computing device 110. For example, an interface may activate and/or detect activated signal lines. Such signal lines may be dedicated to particular signals. Alternatively, an interface may generate data messages to be transmitted across various connections. Exemplary connections may include a parallel interface, a serial interface, a bus interface, and/or a data network.

In various embodiments, the mobile computing device 110 may be generally configured to support or provide cellular voice communication, wireless data communication and computing capabilities. The mobile computing device 110 may be implemented as a combination handheld computer and mobile telephone, sometimes referred to as a smart phone. In various other embodiments, the mobile computing device may also refer to a tablet or a netbook or any other device that can take a physical SIM card slot. Examples of smart phones include, for example, Palm® products such as the Palm Pre™, Palm Pixi™ and Palm Treo™ line of smart phones. Although some embodiments may be described with the mobile computing device 110 implemented as a smart phone by way of example, it may be appreciated that the embodiments are not limited in this context. For example, the mobile computing device 110 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, tablet computer, mobile unit, subscriber station, user terminal, portable computer, handheld computer, palmtop computer, wearable computer, media player, pager, messaging device, data communication device, game device, and so forth. Additional details for a mobile computing device may be described in more detail with reference to FIG. 7.

The processor 102 may comprise a general purpose processor, a communications processor or an application specific processor arranged to provide general or specific computing capabilities for the communications system 100. For example, the processor 102 may perform operations associated with higher layer protocols and applications. For instance, the processor 102 may be implemented as a host processor to provide various user applications, such as telephony, text messaging, email, web browsing, word processing, video signal display, and so forth. In addition, the processor 102 may provide one or more functional utilities that are available to various protocols, operations, and/or applications. Examples of such utilities include operating systems, device drivers, user interface functionality, and so forth.

The memory 103 may comprise computer-readable media such as volatile or non-volatile memory units arranged to store programs and data for execution by the processor 102. As depicted in FIG. 1, the memory 103 may store the SIM module 104 in the form of executable program instructions, code or data. Additionally or alternatively, the memory 103 may also store the user interface 114 in the form of executable program instructions, code or data. The processor 102 may retrieve and execute the program instructions, code or data from the memory 103 to adaptively control one or more operational parameters for the mobile computing device 110, such as operation and/or communication parameters of the radio module 105. Although the SIM module 104 and/or the user interface 114 are described as part of the memory 103 for execution by the processor 102, it may be appreciated that the SIM module 104 and/or the user interface 114 may be stored and executed by other memory and processing resources available to the mobile computing device 110, such as a radio or communications processor and accompanying memory implemented by the radio module 105. Further, although the SIM module 104 and the user interface 114 are depicted as software executed by a processor, it may be appreciated that some or all of these elements may be implemented in hardware as well using one or more integrated circuits, for example. The embodiments are not limited in this context.

Additionally or alternatively, the mobile computing device 110 may include various application programs that are generally designed to allow a user to accomplish one or more specific tasks. Examples of application programs may include, without limitation, a phone application, a contact application, one or more message applications (e.g., telephone, voicemail, facsimile, e-mail, IM, SMS, MMS, video conferencing), a web browser application, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. In various implementations, the application programs may provide one or more graphical user interfaces (GUIs) to communicate information between the mobile computing device 110 and a user. In some embodiments, application programs may comprise upper layer programs running on top of the OS of the host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication. The embodiments are not limited in this context.

The user interface 114 may comprise any user interface or graphic user interface (GUI) suitable for use with the mobile computing device 110. The user interface 114 may comprise a stand-alone application or part of another application, such as an operating system. The user interface 114 may be arranged to receive information from the SIM module 104 and/or various application programs, and generate a user interface message for display on a digital display of the mobile computing device 110. The user interface message may also contain various user interface elements, such as radio buttons or menu choices, to receive user commands via a suitable input device (e.g., a touch screen, thumb board, keypad, trackball, scroll wheel, and so forth).

The radio module 105 may have a radio manager 106 arranged to control some or all of the operations for the radio module 105. For instance, the radio manager 106 may cause one or more radios implemented by the radio module 105 to periodically or continuously scan wireless shared media, such as one or more portions of the radio-frequency (RF) spectrum. In one embodiment, the radio manager 106 may be arranged to intercept and pass network messages from the wireless resources 130-$m$ to the SIM module 104 for processing by the SIM module 104.

It is worthy to note that although the radio manager 106 is shown implemented as part of the radio module 105 in the depicted embodiment, it may be appreciated that the radio manager 106 may be implemented in other parts of the mobile computing device 110, such as the processor 102 and memory 103, for example. The embodiments are not limited in this context.

The radio module 105 may comprise one or more radios 116-$q$ (also referred to as wireless transceivers), each having various radio elements, including a radio processor, one or more transceivers, amplifiers, filters, switches, and so forth. The radio module 105 may communicate with remote devices across different types of wireless links utilizing various wireless wide area network (WWAN) communications techniques. For example, the radio module 105 may communicate across wireless links provided by one or more cellular radiotelephone systems. Examples of cellular radiotelephone systems may include Code Division Multiple Access (CDMA) systems, GSM systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth. The radio module 105 (or additional radio modules) may also communicate across data networking links provided by one or more cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), Long Term Evolution (LTE) systems, and so forth. The embodiments, however, are not limited to these examples.

In some cases, the radio module 105 may additionally or alternatively communicate across various non-cellular communications links, such as a wireless local area network (WLAN). The radio module 105 may be arranged to provide voice and/or data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 110 may also utilize different types of shorter range wireless systems, or wireless personal area networks (WPAN) such as a Bluetooth system operating in accordance with the Bluetooth Special Interest Group (SIG) series of protocols, including Bluetooth Specification versions v1.0, v1.1, v1.2, v1.0, v2.0, v2.1, v3.0 with Enhanced Data Rate (EDR) (as well as one or more Bluetooth Profiles) and any revisions, progeny and variants, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

It may be appreciated that the radio module 105 may utilize different communications elements (e.g., radio processors, transceivers, etc.) to implement different communications techniques. Furthermore, the radio module 105 may support multiple communications techniques by implementing multiple sets of corresponding radio equipment. For example, the radio module 105 may support GSM communications using the radio 116-1, IEEE 802.xx (e.g., 802.11 or 802.16) communications using the radio 116-2, Bluetooth communications using the radio 116-3, and so forth. The embodiments are not limited in this context.

The mobile computing device 110 may comprise one or more physical SIM cards. The physical SIM 107 may comprise, for example, a removable or non-removable smart card arranged to encrypt voice and data transmissions and to store user-specific data for allowing a voice or data communications network to identify and authenticate the user. The physical SIM 107 may also store data such as personal settings specific to the user. Examples of the physical SIM 107 may include without limitation an UMTS universal SIM (USIM) card, a CDMA removable user identity module (R-UIM) card, an Internet Protocol (IP) multimedia services identity module (ISIM), a CDMA subscriber identity module (CSIM), a Willcom-SIM (W-SIM), and so forth. Embodiments may be implemented for any type of physical SIM, including those with different pin configurations, form factors, or computer-readable media, such as micro SIM cards, CDMA SIM cards, USB dongle based external SIM cards, dual-SIM cards, and so forth. Dual SIM cards, for example, would have a virtual SIM card interface comprising two SIM cards, using some of the principles described herein. Other SIM operations would adapt and modify accordingly. The embodiments are not limited in this context.

The physical SIM 107 may further comprise a SIM application toolkit (STK), which is a set of programmed commands for enabling the physical SIM 107 to perform various functions. In some cases, a STK may be arranged to enable the physical SIM 107 to independently control various aspects of the mobile computing device 110. Although some embodiments describe the physical SIM 107 as a SIM card by way of example and not limitation, it may be appreciated that the physical SIM 107 may also be implemented with other removable memory or computer readable media, such as a flash memory card or as a USB dongle, for example. The embodiments are not limited in this context.

The use of SIM cards is mandatory in GSM devices. The equivalent of a SIM in UMTS is called the Universal Integrated Circuit Card (UICC), which runs a USIM application, while the R-UIM is typically used in CDMA-based devices, such as CDMA2000, for example. Many CDMA-based standards do not include any removable card, and the service is bound to a unique identifier contained in secure memory of the mobile computing device 110.

The power module 108 may be arranged to provide power for the mobile computing device 110. In one embodiment, the power module 108 may comprise a power supply (or power supply unit) and the power manager 109. The power supply may be arranged to provide electrical power to the various elements of the mobile computing device 110, and include a power distribution system as well as primary and/or secondary sources of energy. The primary source may include AC line voltage converted to a well-regulated lower-voltage DC for electronic devices (e.g., using a transformer or power converter). The secondary source may include a portable power source, such as a battery, that provides lower-voltage DC as well. The battery may comprise rechargeable and/or non-rechargeable types of batteries.

The power manager 109 may manage various operations for the power supply and/or the mobile computing device 110. For instance, the power manager 109 may place various elements of the mobile computing device 110 into a power-on mode or a power-off mode. When in a power-on mode, the power manager 109 may increase or decrease an amount of power provided to a given set of elements for the mobile computing device 110 in accordance with various power consumption modes. The power manager 109 may also be arranged to measure an amount of remaining power capacity available from the power supply, and generate an available power parameter. The available power parameter may represent, for example, a discharge rate having a unit of amperes (A), milliampere (mA), ampere-hour (Ah), milliampere-hour (mAh), or milliampere second (mAs), or some other measurable power unit. The power manager 109 may manage power for a given set of elements for the mobile computing device 110 in an intelligent manner based on the available power parameter, such as placing the physical SIM 107 in a power saving mode or a power-off mode when the available power parameter is below a defined cut-off value.

The wireless resources 130-n may comprise any wireless device, fixed or mobile, utilizing a radio module implementing the same or similar communication techniques as implemented for the radio module 105. Examples of wireless resources 130-n may include without limitation a wireless access point for a WLAN such as an 802.11 or 802.16 system, a base station or node B for a WWAN such as a cellular radiotelephone system, a wireless gateway for an enterprise network, a peer device such as another mobile computing device 110, a Bluetooth device for a WPAN, and so forth.

In various embodiments, the mobile computing device 110 may comprise or implement the SIM module 104 to generally manage SIM operations for the mobile computing device 110. The SIM module 104 may include the SIM manager 118 and the virtual SIM 119. It may be appreciated that the SIM module 104 may be implemented by the radio module 105 as an alternative embodiment.

The SIM manager 118 may be arranged to manage one or more physical SIMs 107 and corresponding virtual SIMs 119. In one embodiment, multiple physical SIM cards could exist simultaneously on a mobile device, in which case a separate virtual SIM card would exist for every physical SIM card, each such virtual SIM tagged by a unique ID like the IMSI of the physical SIM card or an appropriate unique key. In one embodiment, a physical SIM 107 may be stored on a removable storage unit (e.g., a smart card) for the mobile computing device 110, and the virtual SIM 119 may be stored on a non-removable storage unit (e.g., the memory 103) for the mobile computing device 110. In one embodiment, a virtual SIM card may also be shared between two mobile computing devices, the first of which has a physical SIM card slot while the second does not, in which case the Virtual SIM card could give the illusion of a SIM card control on the second device. In one embodiment, the physical SIM 107 may be stored on a non-removable storage unit for the mobile computing device 110 similar to the virtual SIM 119. In this case, the non-removable storage unit storing the physical SIM 107 is independent from the non-removable storage unit storing the virtual SIM 119, and as such the former may be placed in a power saving mode or a power-off mode while the latter remains in a power-on mode.

The SIM manager 118 may be arranged to detect the physical SIM 107 (and any other physical SIMs) during power-on mode of the mobile computing device 110. The SIM manager 118 may determine a presence of a virtual SIM 119 corresponding to the physical SIM 107 on the mobile computing device 110. The SIM manager 118 may then create a virtual SIM 119 for each physical SIM 107 when not present on the mobile computing device 110.

Each virtual SIM 119 is a replica of a corresponding physical SIM 107, and stored using internal storage for the mobile computing device 110 (e.g., the memory 103). A virtual SIM 119 may comprise or store contents copied from a given physical SIM 107 to allow the virtual SIM 119 to perform some or all operations normally performed by the physical SIM 107 on behalf of the physical SIM 107 when the physical SIM 107 is in a power saving mode or a power-off mode. The physical SIM 107 may store content in the form of one or more files. The SIM manager 118 may copy the one or more files from the physical SIM 107 to the virtual SIM 119, thereby allowing the virtual SIM 119 to operate as a replacement or alternative for the physical SIM 107.

In some cases, however, the physical SIM 107 may store certain secure content that may not be copied to the virtual SIM 119. In one embodiment, the physical SIM 107 may store cryptographic information in protected memory of the physical SIM 107. For instance, for a GSM phone, the physical SIM 107 may store an authentication key (Ki). The Ki is a 128-bit value used in authenticating the physical SIM 107 on a mobile network. Each physical SIM 107 holds a unique Ki assigned to it by the network operator during the personalization process. The Ki is also stored on a database (known as Authentication Center or AuC) on a mobile network. The physical SIM card 107 is designed not to allow the Ki to be obtained using the smart-card interface. Instead, the physical SIM card 107 provides a function (Run GSM Algorithm) that allows the mobile computing device 110 to pass data to the physical SIM card 107 to be signed with the Ki. This, by design, makes usage of the physical SIM card 107 mandatory unless the Ki can be extracted from the physical SIM card 107, or the carrier is willing to reveal the Ki. It is worthy to note that other applicable authentication algorithms may be implemented for different types of physical SIM cards.

In such cases, the SIM manager 118 does not copy the secure content from the physical SIM 107 to the virtual SIM 119. Rather, SIM operations needing secure content stored by the physical SIM 107 may be processed by the physical SIM 107. In such cases, the physical SIM 107 may be awakened from a power saving mode or a power-off mode.

The SIM manager 118 may be arranged to send one or more control directives to the power manager 109 to control a power state for the physical SIM 107. In one embodiment, for example, the SIM manager 118 may send a control directive to the power manager 109 to place the physical SIM 107 in a power savings mode or a power-off mode when the virtual SIM 119 is present on the mobile computing device 110. In one embodiment, for example, the SIM manager 118 may send a control directive to the power manager 109 to place the physical SIM 107 in a power-on mode when the physical SIM 107 is to process a control directive not capable of being handled by the virtual SIM 119 (e.g., an authentication request).

The SIM manager 118 may be arranged to receive or intercept a control directive intended for the physical SIM 107. For instance, the radio manager 106 may re-direct any network control signals, command or control directives from the wireless resources 130-m to the SIM module 104. In another example, the SIM manager 118 may intercept SIM commands from any application programs or system programs residing on the mobile computing device 110. The SIM manager 118 may receive the intercepted control directives, and determine whether the physical SIM 107 or the virtual SIM 119 is to process the control directives. The SIM manager 118 may send the control directives to the physical SIM 107 or the virtual SIM 119 based on the determination for processing.

The SIM manager 118 may determine whether the physical SIM 107 or the virtual SIM 119 is to process the control directive based on a number of factors. For instance, the SIM manager 118 may make this determination based on a given type of control directive, a class for the control directive, a communications protocol for the control directive, metadata for the control directive, a source for the control directive, a power parameter for the power module 108, a radio signal strength for a radio 116-*q*, user commands or preferences, operating parameters for the mobile computing device 110 or the wireless resources 130-*m*, and so forth. The embodiments are not limited in this context.

In general, when the SIM manager 118 detects that the physical SIM 107 is in a power saving mode or a power-off mode, the SIM manager 118 may be arranged to send all control directives intended for processing by the physical SIM 107 to the virtual SIM 119. For instance, in certain cases, over the air (OTA) updates to the physical SIM 107 may be intercepted, decrypted and applied to the virtual SIM 119. However, this may be true only in certain circumstances, for example, when SPI=00 on a secure APDU packet as per GSM specification 23.048. For other cases, the SIM manager 118 may not be able to decipher the packet and may send the request directly to the Physical SIM 107. The Virtual SIM 119 would synchronize later based on the actions of the Physical SIM 107. In another example, the physical SIM 107 may further comprise a SIM application toolkit (STK), which is a set of programmed commands for enabling the physical SIM 107 to perform various functions. In some cases, a STK may be arranged to enable the physical SIM 107 to independently control various aspects of the mobile computing device 110, such as providing custom user messages or blocking certain phone numbers. For such STK cases, if the secure packet is decipherable by the SIM manager 118, then certain Remote File Management procedures could be assumed by the virtual SIM 119 and later synchronized to the physical SIM 107. For other cases, specially where the secure packet is not decipherable (e.g., SPI is not 00), the SIM manager 118 could pass on the functionality to the physical SIM 107. Typically a phone application for the mobile computing device 110 may periodically poll the physical SIM 107 to determine whether the physical SIM 107 needs to send information to the phone application (e.g., block calls). Such operations are power-intensive and significantly impact battery life. Instead, in certain cases where secure packets to the physical SIM card are decipherable by the SIM manager 118, these operations may be performed by the virtual SIM 119 on behalf of the physical SIM 107. At some later point in time, content synchronization may be performed for the virtual SIM 119 and the physical SIM 107 to apply the OTA updates (and any other modified content stored by the virtual SIM 119) to the physical SIM 107. In this manner, the physical SIM 107 may remain in the power saving mode or the power-off mode to continue conserving battery power.

In some cases, however, the virtual SIM 119 may be incapable of processing a control directive on behalf of the physical SIM 107 even if the SIM manager could correctly decipher the meaning or intent of the requested APDU. For instance, the physical SIM 107 may be needed to perform network authentication operations, to enter a user personal identification number (PIN) for a first time, or perform other cryptographic operations. In such cases, the SIM manager 118 may awaken the physical SIM 107 and route such control directives to the physical SIM 107 for processing. For a user personal identification number (PIN) authentication scenario for instance, such action could be taken up by the virtual SIM 107 on subsequent attempts by the user, since at that time the SIM manager 118 would be able to use the clear text value of the PIN entered via the mobile computing device 110. However for keys that are undecipherable and secret within the physical SIM 107, the SIM manager 118 would always direct such requests to the physical SIM 107 by putting the physical SIM 107 to power on mode, and shutting off the physical SIM 107 on getting cryptographic values from the physical SIM 107 to be sent to the network. For file related operations and logic, the virtual SIM 119 will usually assume complete responsibility on behalf of the physical SIM 107 and let the physical SIM 107 be in a power off state.

In one embodiment, for example, the SIM manager 118 may receive an authentication control directive for the physical SIM 107, such as an authentication command embedded in an application packet data unit (APDU) from a cellular base station or node B, or a CDMA request to a RUIM card. The SIM manager 118 may check a set of rules, a profile or status register to determine the physical SIM 107 is to process all authentication control directives. The SIM manager 118 may send a control directive to the power manager 109 to place the physical SIM 107 in a power-on mode from a power saving mode or a complete power-off mode. The SIM manager 118 may then send the authentication control directive (e.g., the APDU) to the physical SIM 107 for processing an authentication response. Once authentication operations are finished, the SIM manager 118 performs an update on the mobile computing device 110 and asks the power manager 109 to shut down the physical SIM 107.

In one embodiment, for example, the SIM manager may receive a call control directive for the physical SIM 107. The SIM manager 118 may check a set of rules, a profile or status register to determine the virtual SIM 119 is to process all call control directives. Additionally or alternatively, the SIM manager 118 may by default route all control directives other than certain types, such as authentication control directives or cryptographic control directives (e.g., a personal identification number), to the virtual SIM 119 for processing. In either case, the SIM manager 118 may determine the virtual SIM 119 is to process the call control directive, and send the call control directive to the virtual SIM 119 for handling.

In addition to switching control directives to the physical SIM 107 and the virtual SIM 119, the SIM manager 118 may synchronize content between the physical SIM 107 and the virtual SIM 119. In one embodiment, for example, the SIM manager 118 may write modified content from the virtual SIM 119 to the physical SIM 107, and vice-versa. In this manner, the physical SIM 107 and the virtual SIM 119 may maintain the same or similar content.

The SIM manager 118 may perform content synchronization in a number of different ways. For instance, the SIM manager 118 may perform content synchronization in real-time, copying modified content between the physical SIM 107 and the virtual SIM 119 as modification occurs. However, this may consume significant amounts of power and may not be desirable for some implementations. In other examples, the SIM manager 118 may perform content synchronization based on a defined schedule, defined time intervals, defined events, on demand or request, and so forth. The embodiments are not limited in this context.

To enhance power conservation, the SIM manager 118 may perform content synchronization based on a lazy-write algorithm. In a lazy-write algorithm, writes are not immediately mirrored between the physical SIM 107 and the virtual SIM 119. Instead, the virtual SIM 119 may track which of its respective locations have been written over and marks these locations as dirty. The data in these locations is written back to the physical SIM 107 and/or the virtual SIM 119 at a later time. For instance, the SIM manager 118 may perform a lazy-write of modified content from the virtual SIM 119 to the physical SIM 107 prior to entering a power-off mode for the mobile computing device 110 (e.g., during shut-down operations). Additionally or alternatively, the SIM manager 118 may perform a lazy-write of modified content from the virtual SIM 119 to the physical SIM 107 when the physical SIM 107 exits a power saving mode, enters a power-on mode, detects removal of the physical SIM 107 from the SIM reader implemented by the mobile computing device 110, and other trigger points. It may be appreciated that other write logic determined algorithmically may be implemented, for example, such as an immediate update, or updating when phone goes to offline mode from the network, or using a combination of methods to tackle exceptional cases such as SIM hot swap where timing is critical, The SIM manager 118 may perform content synchronization at any given time for a given implementation, and the embodiments are not limited in this context.

Figure 2:
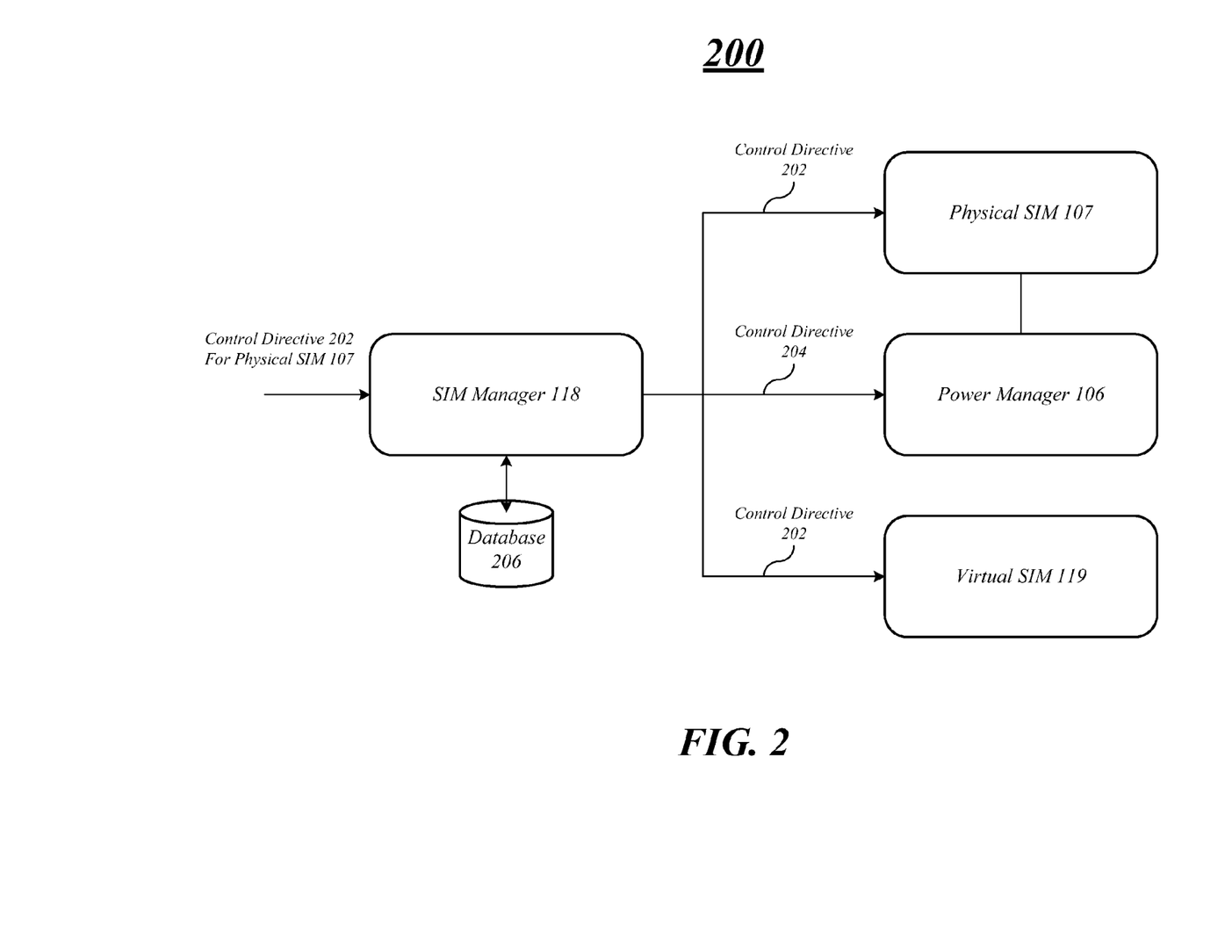
FIG. 2 illustrates one embodiment of a logic diagram.

FIG. 2 illustrates a logic diagram 200. The logic diagram 200 may illustrate one or more interfaces that may employ various techniques to exchange information between the elements of the mobile computing device 110, such as those shown and described with reference to the mobile computing device 110 of FIG. 1. For example, an interface may activate and/or detect activated signal lines like VCC or CLOCK. Such signal lines may be dedicated to particular signals. An interface may stop VCC or CLOCK or take appropriate measures with the SIM contact pins that are accessible to the mobile computing device 110, such that the physical SIM 107 is in an electrically disconnected state from the mobile computing device 110, such that in this state the physical SIM 107 does not draw any power from the mobile computing device 110. This is the case where the physical SIM 107 is completely shut down. An interface may continue to keep the physical SIM 107 in such state while the virtual SIM 119 can do operations on behalf of the physical SIM 107. An interface may be programmed or may algorithmically determine when to electrically power on the physical SIM 107. Alternatively, an interface may generate data messages to be transmitted across various connections. Exemplary connections may include a parallel interface, a serial interface, a bus interface, and/or a data network.

In particular, FIG. 2 illustrates an exemplary architecture suitable for managing the physical SIM 107 for the mobile computing device 110. The SIM module 104 may be communicatively coupled to the radio module 105 and the physical SIM 107 to exchange information with each element over one or more communications buses and associated interfaces.

In the illustrated embodiment shown in FIG. 1, the SIM manager 118 may be arranged to receive or intercept a control directive 202 intended for the physical SIM 107. The control directive 202 may be intercepted by various elements of the mobile computing device 110, including the radio manager 106, the SIM manager 118, an application program, a system program (e.g., an operating system), and other elements in a signal path for the control directive 202. The SIM manager 118 may receive the control directive 202, and determine whether the physical SIM 107 or the virtual SIM 119 is to process the control directive 202 based on a set of rules stored by a database 206. The SIM manager 118 may send the control directive 202 to the physical SIM 107 or the virtual SIM 119 based on the determination.

When the SIM manager 118 detects that the physical SIM 107 is in a power saving mode or a power-off mode, the SIM manager 118 may attempt to send a majority of SIM control directives intended for processing by the physical SIM 107 to the virtual SIM 119. Examples of SIM control directives may include without limitation a transmission protocol data unit (TPDU), an application PDU (APDU), and so forth. A TPDU may include various SIM commands, including commands such as CLA, INS, P1, P2, P3, network-specific instructions, vendor-specific instructions, application-specific instructions, protocol instructions, and so forth. An APDU may include various SIM commands for file system management and security techniques. Typically a TPDU and an APDU include a set of commands requiring some form of processing and response by the physical SIM 107. By allowing the virtual SIM 119 to process and respond to various SIM commands on behalf of the physical SIM 107, the physical SIM 107 may remain in a power saving mode or the power-off mode to continue conserving battery power. In some cases, however, the virtual SIM 119 may be incapable of processing a control directive on behalf of the physical SIM 107. In such cases, the SIM manager 118 may awaken the physical SIM 107 and route such control directives to the physical SIM 107 for processing. However, the timings of such synchronizations could be managed to the advantage of conserving battery power on the mobile computing device, for example, by using lazy write techniques.

In one embodiment, for example, the control directive 202 may comprise an APDU from a wireless resource 130-*m*. The SIM manager 118 may check a set of rules stored in the database 206 to determine the physical SIM 107 is to process all authentication control directives. The SIM manager 118 may send a control directive 204 to the power manager 109 to place the physical SIM 107 in a power-on mode from a power saving mode or a power-off mode. The power manager 109 may receive the control directive 204, and instruct the physical SIM 107 to exit the power saving mode or enter a power-on mode. The SIM manager 118 may then send the control directive 202 (e.g., the APDU) to the physical SIM 107 for processing.

In one embodiment, for example, the SIM manager 118 may receive a call control directive 202 for the physical SIM 107. The SIM manager 118 may check a set of rules in the database 206 to determine the virtual SIM 119 is to process all call control directives. The SIM manager 118 may determine the virtual SIM 119 is to process the call control directive 202, and send the call control directive 202 to the virtual SIM 119. The virtual SIM 119 may process the call control directive 202 using a same or similar set of operations and information provided by the physical SIM 107. At this time, the physical SIM 107 would be in a power-off or power savings state and would play no role in the call control directive. It can be appreciated that other directives similar to call control can be processed in a similar manner.

Operations for the above embodiments may be further described with reference to the following figures and accompanying examples. Some of the figures may include a logic flow and/or a logic diagram. Although such figures presented herein may include a particular logic flow and/or logic diagram, it can be appreciated that the logic flow and/or logic diagram merely provides an example of how the general functionality as described herein can be implemented. Further, the given logic flow and/or logic diagram does not necessarily have to be executed in the order presented, unless otherwise indicated. In addition, the given logic flow and/or logic diagram may be implemented by a hardware element (e.g., a logic device), a software element executed by a processor, or any combination thereof. The embodiments are not limited in this context.

Figure 3:
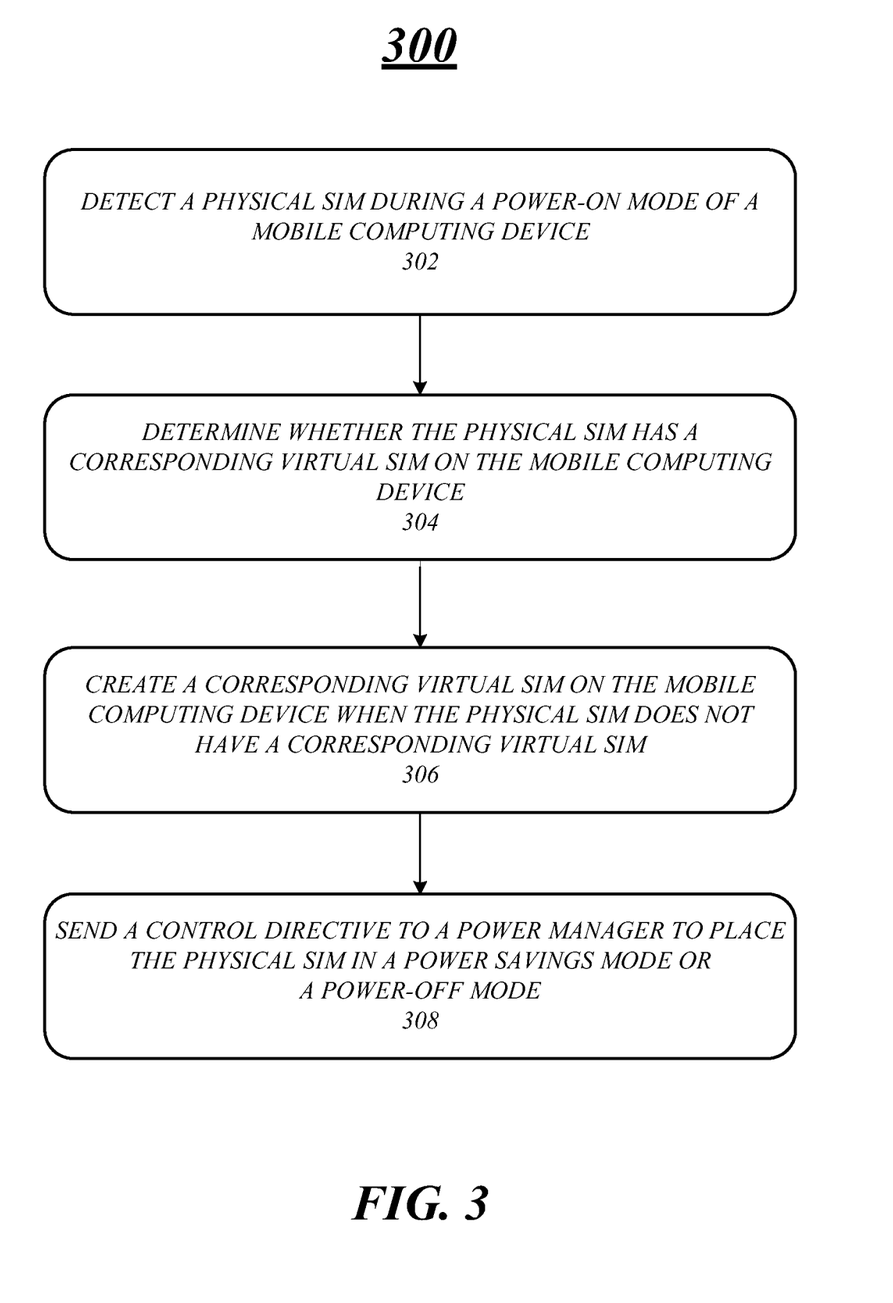
FIG. 3 illustrates one embodiment of a first logic flow.

FIG. 3 illustrates a logic flow. In particular, FIG. 3 illustrates a logic flow 300, which may be representative of the operations executed by one or more embodiments described herein, such as the SIM module 104, for example.

As shown in the FIG. 3, the logic flow 300 may detect a physical SIM during a power-on mode of the mobile computing device 110 at block 302. For example, the SIM manager 118 may detect a presence of the physical SIM 107 during a power-on mode of the mobile computing device 110. The embodiments are not limited in this context.

The logic flow 300 may determine whether the physical SIM has a corresponding virtual SIM on the mobile computing device at block 304. For example, the SIM manager 118 may determine whether the physical SIM 107 has a corresponding virtual SIM 119 on the mobile computing device 110 using the IMSI as a key. The corresponding virtual SIM 119 may not initially even be on the mobile computing device 110. Some embodiments, for example, may be able to locate a pre-existing virtual SIM 119 for a given physical SIM 107 that is stored outside of the mobile computing device 110, and may be able to download such a virtual SIM 119 onto the mobile computing device 110 using cloud computing techniques. In another embodiment, two or more mobile computing devices using a similar OS (e.g., Palm webOS devices), such as a smart phone and a tablet, could share and manage a single virtual SIM 119 between each other, where such multiple devices would typically belong to the same user and network operator. For example, a first device may have a physical SIM card 107 while a second device may not, giving the second device an illusion of having a physical SIM 107 and related control with respect to a network operator, but saving on a physical SIM slot on the second device. The embodiments are not limited in this context.

The logic flow 300 may create a corresponding virtual SIM on the mobile computing device when the physical SIM does not have a corresponding virtual SIM at block 306. For example, the SIM manager 118 may create a corresponding virtual SIM 119 on the mobile computing device 110 when the physical SIM 107 does not have a corresponding virtual SIM 119 on the mobile computing device 110. This may occur, for example, on a first time boot-up of the mobile computing device 110 with the physical SIM 107. The mobile computing device 110 might also need to synchronize an existing virtual SIM 119 to the physical SIM 107 on first boot up in case contents on the physical SIM 107 have changed on another device, using the principles of IMSI lock. The embodiments are not limited in this context.

The logic flow 300 may send a control directive to a power manager to place the physical SIM in a power savings mode or a power-off mode at block 308. For example, the SIM manager 118 may send the control directive 204 to the power manager 109 to place the physical SIM 107 in a power savings mode or a power-off mode when operating from a portable power source, such as a battery. The embodiments are not limited in this context.

Figure 4:
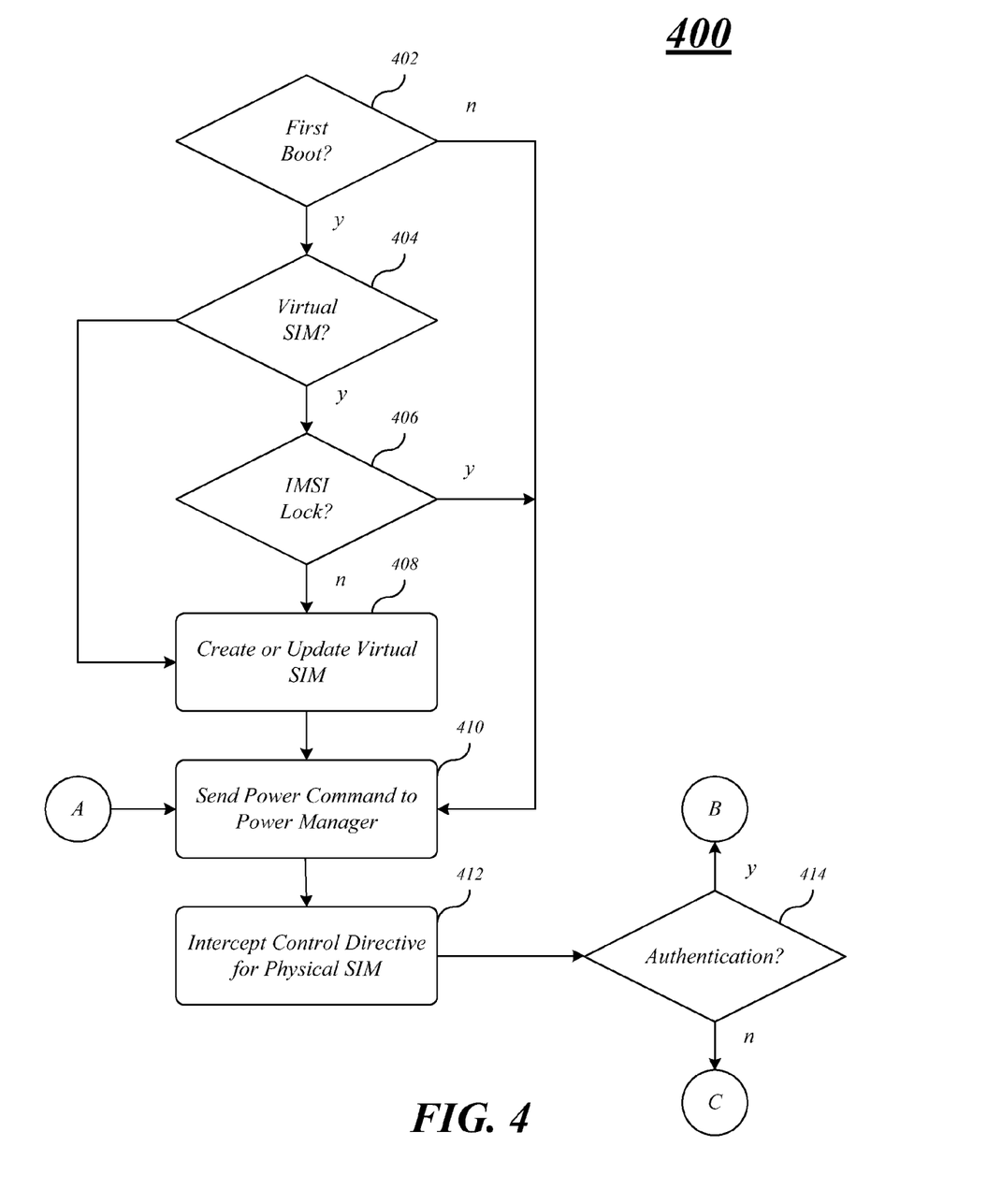
FIG. 4 illustrates one embodiment of a second logic flow.

FIG. 4 illustrates a logic flow 400, which may be representative of the operations executed by one or more embodiments described herein. For instance, the logic flow 400 illustrates a more specific implementation for operations performed by the SIM module 104.

In the illustrated embodiment shown in FIG. 4, the logic flow 400 may determine whether this a first time boot-up of the mobile computing device 110 with the physical SIM 107 at diamond 402. If it is not a first time boot-up at diamond 402, the SIM manager 118 assumes the virtual SIM 119 has been already created, and the SIM manager 118 sends a power command to the power manager 109 to place the physical SIM 107 in a power saving mode or a power-off mode at block 410.

The radio manager 106 intercepts the control directive 202 intended for the physical SIM 107 (e.g., CLA, INS, P1, P2, P3, etc.) at block 412. The radio manager 106 may route the intercepted control directive 202 to the SIM manager 118. Additionally or alternatively, the SIM manager 118 may be arranged to intercept the control directive 202 intended for the physical SIM 107. The embodiments are not limited in this context.

The SIM manager 118 then determines whether the control directive 202 is an authentication control directive at diamond 414. This check can be made for authentication or an encrypted APDU. The SIM manager 118 passes control to control point B if the control directive 202 is an authentication control directive or control point C if the control directive 202 is not an authentication control directive. For authentication operations, the virtual SIM 119 may be able to handle all clear text related authentication operations without referring to the physical SIM 107. For example, once the user has correctly verified a PIN, the virtual SIM 119 could perform subsequent PIN authentication operations within itself without waking up the physical SIM 107, and handle further SIM related operations moving forward from this point on behalf of the physical SIM card If it is a first time boot-up at diamond 402, however, the SIM manager 118 determines whether the physical SIM 107 has a corresponding the virtual SIM 119 at diamond 404. In one embodiment, the SIM manager 118 may determine this by examining an international mobile subscriber identity (IMSI) identifier. An IMSI identifier is a unique identification associated with all GSM and UMTS network mobile phone users. It is typically stored as a 64-bit field in the physical SIM 107 and is sent by the mobile computing device 110 to the network. It is also used for acquiring other details of the mobile computing device 110 in a home location register (HLR) or as locally copied in a visitor location register. An IMSI identifier is usually presented as a 15 digit long number, but can be shorter or longer for a given implementation. During a first time boot-up, the SIM manager 118 may retrieve the IMSI identifier and search the virtual SIM 119 (or other virtual SIMs on the mobile computing device 110) to determine whether it has a matching IMSI identifier.

If the IMSI identifiers do not match at diamond 404, the SIM manager 118 creates a virtual SIM 119 for the physical SIM 107 by reading all required SIM files from the physical SIM 107 and writing the SIM files to the virtual SIM 119 at block 408. The SIM manager 118 then tags the virtual SIM 119 with the IMSI identifier read from the physical SIM 107.

If the IMSI identifiers do match at diamond 404, thereby indicating a virtual SIM 119 for the physical SIM 107 has already been created, the SIM manager 118 determines whether an IMSI lock has been placed for the physical SIM 107 at diamond 406. If there is not an IMSI lock, the SIM manager 118 updates the virtual SIM 119 with any new files from the physical SIM 107 at block 408. If there is an IMSI lock, then the SIM manager 118 sends a power command to the power manager 109 to place the physical SIM 107 in a power saving mode or a power-off mode at block 410, and continues processing at block 412 and diamond 414.

It is worthy to note that there are various categories of IMSI lock, and such an application may be restricted to those types of IMSI locks where a particular SIM card is locked to a device, and not other general categories of SIM lock. For other SIM lock categories, the SIM manager 118 may decide to assume that the previous virtual SIM 119 still requires synchronization with the physical SIM 107 on boot up. In other cases, such boot-up synchronization may be avoided.

Figure 5:
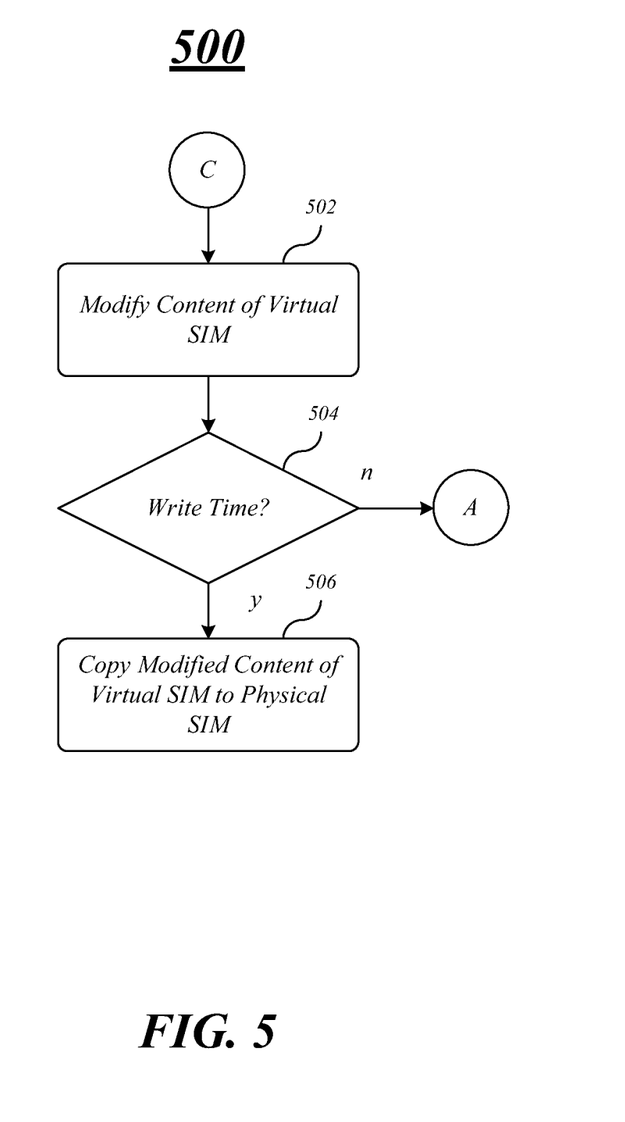
FIG. 5 illustrates one embodiment of a third logic flow.

FIG. 5 illustrates a logic flow 500, which may be representative of the operations executed by one or more embodiments described herein. For instance, the logic flow 500 illustrates a more detailed logic flow for operations performed by the SIM module 104 as control is passed from control point A to control point C. As described with reference to the logic flow 400, the SIM manager 118 determines whether the control directive 202 is an authentication control directive at diamond 414, and passes control to control point C if the control directive 202 is not an authentication control directive.

In the illustrated embodiment shown in FIG. 5, the logic flow 500 modifies content of the virtual SIM 119 at block 502. The SIM manager 118 performs all relevant computations on behalf of the physical SIM card 107 using the virtual SIM card 119, and updates the virtual file system if needed on the mobile computing device 110. This may even include, for example, personal identification number (PIN) operations performed by the virtual SIM 119 which can later be applied to the physical SIM 107 during content synchronization.

The logic flow 500 determines whether it is time to perform content synchronization between the virtual SIM 119 and the physical SIM 107 based on a given content synchronization algorithm implemented by the SIM manager 118 at diamond 504. In one embodiment, for example, the SIM manager 118 may implement a content synchronization algorithm as a lazy-write algorithm. If it is time for content synchronization, the SIM manager 118 writes any modified content from the virtual SIM 119 to the physical SIM 107 at block 506. In one embodiment, the SIM manager 118 may perform content synchronization during shut-down of the mobile computing device 110, removal of the physical SIM card 107 from the mobile computing device 110, and other triggering events. If it is not time for content synchronization, control is passed to control point A as described with reference to FIG. 4.

Figure 6:
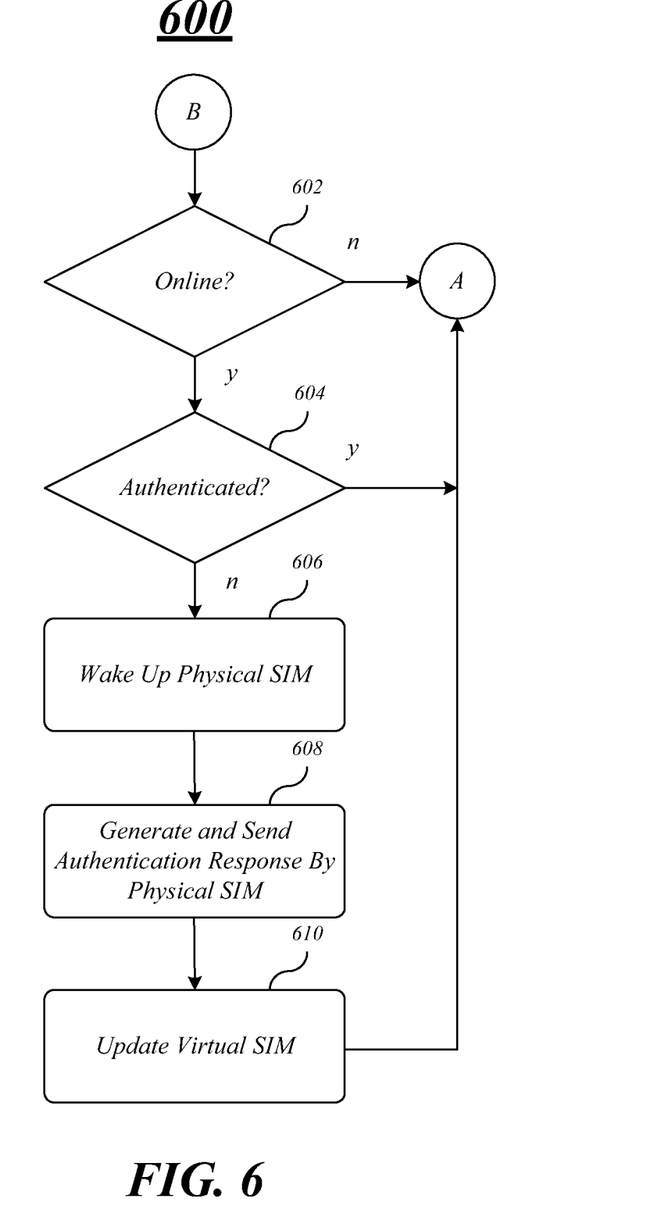
FIG. 6 illustrates one embodiment of a fourth logic flow.

FIG. 6 illustrates a logic flow 600, which may be representative of the operations executed by one or more embodiments described herein. For instance, the logic flow 600 illustrates a more detailed logic flow for operations performed by the SIM module 104 as control is passed from control point A to control point B. As described with reference to the logic flow 400, the SIM manager 118 determines whether the control directive 202 is an authentication control directive at diamond 414, and passes control to control point B if the control directive 202 is an authentication control directive.

In the illustrated embodiment shown in FIG. 6, the logic flow 600 determines whether one of the radios 116-$q$ are online and have a network connection with a wireless resource 130-$m$ at diamond 602. If offline, control is passed to control point A as described with reference to FIG. 4. If online, however, the logic flow 600 determines whether user authentication has been performed for PIN1 at diamond 604. It is worthy to note that authentication operations also refer to Network Authentication challenge-response mechanisms for which the SIM manager 118 cannot bypass the physical SIM 107, and that the virtual SIM 119 may be able to handle user authentication of PIN1 on subsequent similar attempts by the user, If so, control is passed to control point A. If user authentication has not been performed, the SIM manager 118 sends the control directive 204 to the power manager 109 to wake-up the physical SIM 107 at block 606, and sends the control directive 202 comprising an authentication APDU to the physical SIM 107 for processing. The physical SIM 107 may receive the authentication APDU, generate an authentication response, and send the authentication response to the requesting application or service via the SIM manager 118 at block 608. The SIM manager 118 may update the virtual SIM 119 if needed at block 610, at which point control is passed back to control point A. It may also be appreciated that in case the virtual SIM 119 stores critical data from the physical SIM 107, such data within the virtual SIM 107 can be stored on the mobile computing device 110 with appropriate security that is equivalent or better than the actual security provided by the physical SIM 107.

Figure 7:
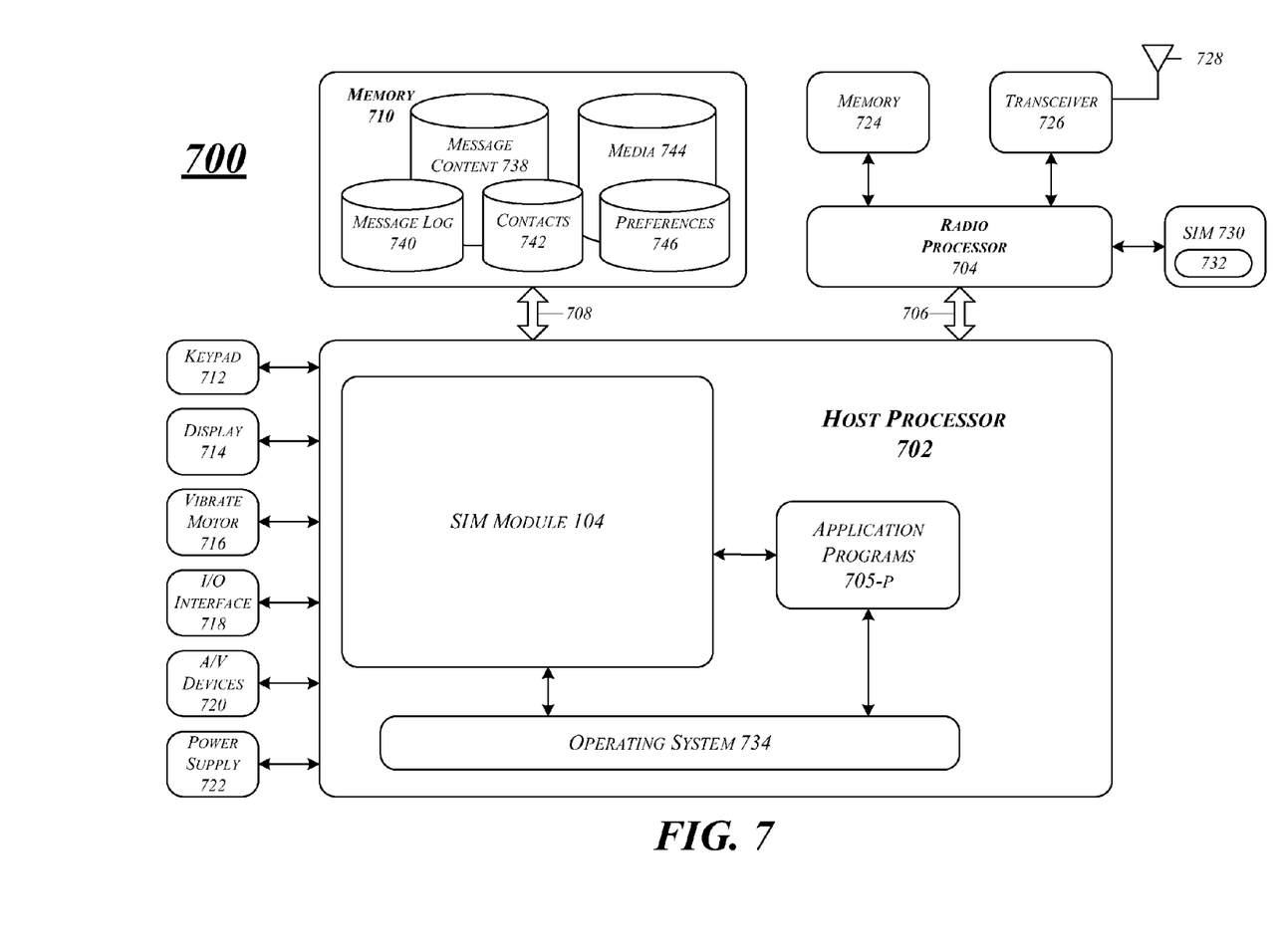
FIG. 7 illustrates one embodiment of a second mobile computing device.

FIG. 7 illustrates a block diagram of a second mobile computing device 700 suitable for implementing various embodiments, including the mobile computing device 110. It may be appreciated that the mobile computing device 700 is only one example of a suitable mobile computing environment and is not intended to suggest any limitation as to the scope of use or functionality of the embodiments. Neither should the mobile computing device 700 be interpreted as having any dependency or requirement relating to any one or combination of components illustrated in the exemplary mobile computing device 700.

The host processor 702 (e.g., similar to the processor 102) may be responsible for executing various software programs such as system programs and applications programs to provide computing and processing operations for the mobile computing device 700. The radio processor 704 may be responsible for performing various voice and data communications operations for the mobile computing device 700 such as transmitting and receiving voice and data information over one or more wireless communications channels. Although the mobile computing device 700 is shown with a dual-processor architecture, it may be appreciated that the mobile computing device 700 may use any suitable processor architecture and/or any suitable number of processors or number of processor cores in accordance with the described embodiments. In one embodiment, for example, the processors 702, 704 may be implemented using a single integrated processor.

The host processor 702 may be implemented as a host central processing unit (CPU) using any suitable processor or logic device, such as a as a general purpose processor. The host processor 702 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 702 may be coupled through a memory bus 708 to a memory 710. The memory bus 708 may comprise any suitable interface and/or bus architecture for allowing the host processor 702 to access the memory 710. Although the memory 710 may be shown as being separate from the host processor 702 for purposes of illustration, it is worthy to note that in various embodiments some portion or the entire memory 710 may be included on the same integrated circuit as the host processor 702. Alternatively, some portion or the entire memory 710 may be disposed on an integrated circuit or other medium (e.g., hard disk drive) external to the integrated circuit of the host processor 702. In various embodiments, the mobile computing device 700 may comprise an expansion slot to support a multimedia and/or memory card, for example.

The memory 710 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EE- PROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 700 may comprise an alphanumeric keypad 712 coupled to the host processor 702. Additionally or alternatively, the mobile computing device 700 may utilize a virtual keyboard (e.g., on a touch screen display). The keypad 712 may comprise, for example, a QWERTY key layout and an integrated number dial pad. The mobile computing device 700 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 712 may comprise a physical keypad using hard buttons, or a virtual keypad using soft buttons displayed on a display 714. The keypad may also comprise a thumbboard.

The mobile computing device 700 may comprise a display 714 coupled to the host processor 702. The display 714 may comprise any suitable visual interface for displaying content to a user of the mobile computing device 700. In one embodiment, for example, the display 714 may be implemented by a liquid crystal display (LCD) such as a touch-sensitive or touch screen color (e.g., 76-bit color) thin-film transistor (TFT) LCD screen. The touch-sensitive or touch screen LCD may be used with a stylus and/or a handwriting recognizer program.

The mobile computing device 700 may comprise a vibrating motor 716 coupled to the host processor 702. The vibrating motor 716 may be enable or disabled according to the preferences of the user of the mobile computing device 700. When enabled, the vibrating motor 716 may cause the mobile computing device 700 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 700 may comprise an input/output (I/O) interface 718 coupled to the host processor 702. The I/O interface 718 may comprise one or more I/O devices such as a serial connection, SDIO bus, PCI, USB, an infrared port, integrated Bluetooth wireless capability, global position system (GPS) capability, and/or integrated 802.11x (e.g. 802.11b, 802.11g, 802.11a, 802.11n, etc.) (WiFi) wireless capability, to enable wired (e.g., USB cable) and/or wireless connection to a local computer system, such as a local personal computer (PC). In various implementations, mobile computing device 700 may be arranged to synchronize information with a local computer system.

The host processor 702 may be coupled to various audio/video (A/V) devices 720 that support A/V capability of the mobile computing device 700. Examples of A/V devices 720 may include, for example, a microphone, one or more speakers (such as speaker system 108), an audio port to connect an audio headset, an audio coder/decoder (codec), an audio player, a Musical Instrument Digital Interface (MIDI) device, a digital camera, a video camera, a video codec, a video player, and so forth.

The host processor 702 may be coupled to a power supply 722 arranged to supply and manage power to the elements of the mobile computing device 700. In various embodiments, the power supply 722 may be implemented by a rechargeable battery, such as a removable and rechargeable lithium ion battery to provide direct current (DC) power, and/or an alternating current (AC) adapter to draw power from a standard AC main power supply. The power supply 722 may be representative of a power supply for the power module 108 described with reference to FIG. 1, for example.

The radio processor 704 may be arranged to communicate voice information and/or data information over one or more assigned frequency bands of a wireless communication channel. The radio processor 704 may be implemented as a communications processor using any suitable processor or logic device, such as a modem processor or baseband processor. The radio processor 704 may also be implemented as a digital signal processor (DSP), media access control (MAC) processor, or any other type of communications processor in accordance with the described embodiments. The radio processor 704 may perform analog and/or digital baseband operations for the mobile computing device 700. For example, the radio processor 704 may perform digital-to-analog conversion (DAC), analog-to-digital conversion (ADC), modulation, demodulation, encoding, decoding, encryption, decryption, and so forth. The radio processor 704 may be representative of a radio processor for the radio module 105 described with reference to FIG. 1, for example.

The mobile computing device 700 may comprise a memory 724 coupled to the radio processor 704. The memory 724 may be implemented using any of the computer-readable media described with reference to the memory 710. The memory 724 may be typically implemented as flash memory and synchronous dynamic random access memory (SDRAM). Although the memory 724 may be shown as being separate from the radio processor 704, some or all of the memory 724 may be included on the same IC as the radio processor 704.

The mobile computing device 700 may comprise a transceiver module 726 coupled to the radio processor 704. The transceiver module 726 may comprise one or more transceivers or radios, such as wireless transceivers 108 of mobile computing device 100, arranged to communicate using different types of protocols, communication ranges, operating power requirements, RF sub-bands, information types (e.g., voice or data), use scenarios, applications, and so forth. In various embodiments, the transceiver module 726 may comprise one or more transceivers arranged to support voice communications and/or data communications for the wireless network systems or protocols as previously described. In some embodiments, the transceiver module 726 may further comprise a Global Positioning System (GPS) transceiver to support position determination and/or location-based services.

The transceiver module 726 generally may be implemented using one or more chips as desired for a given implementation. Although the transceiver module 726 may be shown as being separate from and external to the radio processor 704 for purposes of illustration, it is worthy to note that in various embodiments some portion or the entire transceiver module 726 may be included on the same integrated circuit as the radio processor 704. The embodiments are not limited in this context.

The mobile computing device 700 may comprise an antenna system 728 for transmitting and/or receiving electrical signals. As shown, the antenna system 728 may be coupled to the radio processor 704 through the transceiver module 726. The antenna system 728 may comprise or be implemented as one or more internal antennas and/or external antennas, such as antenna 112 of mobile computing device 100.

The mobile computing device 700 may comprise a subscriber identity module (SIM) 730 coupled to the radio processor 704. The SIM 730 may be representative of, for example, the physical SIM 107. The SIM 730 may comprise a SIM application toolkit (STK) 732 comprising a set of programmed commands for enabling the SIM 730 to perform various functions. In some cases, the STK 732 may be arranged to enable the SIM 730 to independently control various aspects of the mobile computing device 700.

As mentioned above, the host processor 702 may be arranged to provide processing or computing resources to the mobile computing device 700. For example, the host processor 702 may be responsible for executing various software programs including system programs such as operating system (OS) 734 and application programs 736. System programs generally may assist in the running of the mobile computing device 700 and may be directly responsible for controlling, integrating, and managing the individual hardware components of the computer system. The OS 734 may be implemented, for example, as a Palm WebOS®, Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 700 may comprise other system programs such as device drivers, programming tools, utility programs, software libraries, application programming interfaces (APIs), and so forth.

Application programs 736 generally may allow a user to accomplish one or more specific tasks. In various implementations, the application programs 736 may provide one or more graphical user interfaces (GUIs) to communicate information between the mobile computing device 700 and a user. In some embodiments, application programs 736 may comprise upper layer programs running on top of the OS 737 of the host processor 702 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 736 may include, without limitation, message applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Message applications may be arranged to communicate various types of messages in a variety of formats. Examples of message applications may include without limitation a cellular telephone application, a Voice over Internet Protocol (VoIP) application, a Push-to-Talk (PTT) application, a voicemail application, a facsimile application, a video teleconferencing application, an IM application, an email application, an SMS application, an MMS application, and so forth. It is also to be appreciated that the mobile computing device 700 may implement other types of applications in accordance with the described embodiments.

The host processor 702 may include the SIM module 104 and the application program 105-*p* in some embodiments, as described with reference to FIG. 1, for example.

The mobile computing device 700 may include various databases implemented in the memory 710. For example, the mobile computing device 700 may include a message content database 738, a message log database 740, a contacts database 742, a media database 744, a preferences database 746, and so forth. The message content database 738 may be arranged to store content and attachments (e.g., media objects) for various types of messages sent and received by one or more message applications. The message log 740 may be arranged to track various types of messages which are sent and received by one or more message applications. The contacts database 742 may be arranged to store contact records for individuals or entities specified by the user of the mobile computing device 700. The media database 744 may be arranged to store various types of media content such as image information, audio information, video information, and/or other data. The preferences database 746 may be arranged to store various settings such as rules and parameters for controlling the operation of the mobile computing device 700.

In some cases, various embodiments may be implemented as an article of manufacture. The article of manufacture may include a computer readable storage medium arranged to store logic, instructions and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device comprising:
   memory resources; and
   processing resources coupled to the memory resources to implement:
      a subscriber identity module (SIM) manager to manage a physical SIM stored on a removable storage unit for the mobile computing device and a virtual SIM stored on a non-removable storage unit for the mobile computing device, the virtual SIM comprising contents copied from the physical SIM to allow the virtual SIM to perform operations on behalf of the physical SIM;
      wherein when the SIM manager receives an authentication control directive for the physical SIM, the SIM manager (i) determines that the physical SIM is to process the authentication control directive, (ii) causes a power manager to place the physical SIM in a power-on mode, and (iii) sends the authentication control directive to the physical SIM.

2. The mobile computing device of claim 1, wherein the SIM manager detects the physical SIM during power-on mode of the mobile computing device, determines a presence of the virtual SIM, and creates the virtual SIM when not present on the mobile computing device.

3. The mobile computing device of claim 1, wherein the SIM manager sends a control directive to the power manager to place the physical SIM in a power savings mode when the virtual SIM is present on the mobile computing device.

4. The mobile computing device of claim 1, wherein the SIM manager sends a control directive to the power manager to place the physical SIM in a power-off mode when the virtual SIM is present on the mobile computing device.

5. The mobile computing device of claim 1, wherein the SIM manager sends a control directive to the power manager to place the physical SIM in the power-on mode when the physical SIM is to process the authentication control directive.

6. The mobile computing device of claim 1, wherein the SIM manager is operative to receive a control directive for the physical SIM, determine whether the physical SIM or the virtual SIM is to process the control directive, and send the control directive to the physical SIM or the virtual SIM based on the determination.

7. The mobile computing device of claim 1, wherein the SIM manager is operative to send a control directive to the power manager to place the physical SIM in a power savings mode or power-off mode in response to determining that authentication operations corresponding to the authentication control directive have been completed.

8. The mobile computing device of claim 1, wherein the SIM manager is operative to receive a call control directive for the physical SIM, determine that the virtual SIM is to process the call control directive, and send the call control directive to the virtual SIM.

9. The mobile computing device of claim 1, wherein the SIM manager is operative to write modified content from the virtual SIM to the physical SIM.

10. The mobile computing device of claim 1, further comprising a power module coupled to the physical SIM, the power module comprising the power manager and a battery, the power manager operative to control power to the physical SIM from the battery.

11. A method for operating a mobile computing device, the method being performed by a processor and comprising:
   detecting a physical subscriber identity module (SIM) during a power-on mode of the mobile computing device, the physical SIM being stored on a removable storage unit for the mobile computing device;
   determining that the physical SIM does not have a corresponding virtual SIM on the mobile computing device;
   creating a corresponding virtual SIM on the mobile computing device in response to determining that the physical SIM does not have a corresponding virtual SIM, the virtual SIM comprising contents copied from the physical SIM to allow the virtual SIM to perform operations on behalf of the physical SIM;
   sending a control directive to a power manager to place the physical SIM in a power savings mode or a power-off mode;
   receiving an authentication control directive for the physical SIM;
   determining that the physical SIM is to process the authentication control directive;
   causing the power manager to place the physical SIM in a power-on mode; and
   sending the authentication control directive to the physical SIM.

12. The method of claim 11, wherein sending a control directive to a power manager to place the physical SIM in a power savings mode or a power-off mode includes switching control directives for the physical SIM to the virtual SIM.

13. The method of claim 11, further comprising performing a lazy-write of modified content from the virtual SIM to the physical SIM prior to entering a power-off mode for the mobile computing device.

14. An article of manufacture comprising a non-transitory computer-readable storage medium containing instructions that, when executed by a processor, cause the processor to:
   receive a control directive for a physical subscriber identity module (SIM) of a wireless device, the physical SIM being stored on a removable storage unit for the wireless device;
   determine whether the physical SIM or a virtual SIM corresponding to the physical SIM is to process the control directive, the virtual SIM comprising contents copied from the physical SIM to allow the virtual SIM to perform operations on behalf of the physical SIM; and in response to determining that the physical SIM is to process the control directive, (i) causing a power manager to place the physical SIM in a power-on mode, and (ii) sending the control directive to the physical SIM.

15. The article of manufacture of claim 14, wherein the instructions further cause the processor to detect the physical SIM during a power-on mode of the wireless device, determine whether the virtual SIM is present on the wireless device, create the virtual SIM when the virtual SIM is not present on the wireless device, and cause the physical SIM to be placed in a power savings mode or a power-off mode.

16. The article of manufacture of claim 14, wherein the instructions further cause the processor to write modified content from the virtual SIM to the physical SIM based on a lazy-write schedule.

* * * * *